US005543939A

United States Patent [19]
Harvey et al.

[11] Patent Number: 5,543,939
[45] Date of Patent: Aug. 6, 1996

[54] VIDEO TELEPHONE SYSTEMS

[75] Inventors: Robert L. Harvey, Lexington; Patrick R. Hirschler-Marchand, Concord, both of Mass.; David J. Cipolle, Newton, N.H.

[73] Assignee: Massachusetts Institute of Technology, Cambridge, Mass.

[21] Appl. No.: 300,587

[22] Filed: Sep. 2, 1994

Related U.S. Application Data

[63] Continuation of Ser. No. 635,986, Dec. 26, 1990, abandoned, which is a continuation-in-part of Ser. No. 458,282, Dec. 28, 1989, abandoned.

[51] Int. Cl.$^6$ .............................. H04N 1/41; H04N 1/40; H04N 7/12; H04N 11/02
[52] U.S. Cl. ...................... 358/426; 358/429; 358/455; 358/457; 358/458; 358/466; 348/407; 348/415
[58] Field of Search .................................. 358/428, 429, 358/430, 261.2, 426, 455, 456, 457, 465, 466, 479; 348/407, 415, 390

[56] References Cited

U.S. PATENT DOCUMENTS

| | | | |
|---|---|---|---|
| 3,937,878 | 2/1976 | Judice | 178/7.3 D |
| 3,959,583 | 5/1976 | Fudice et al. | 358/240 |
| 3,962,535 | 6/1976 | Haskell | 178/6 |
| 3,974,325 | 8/1976 | Wilmer | 358/428 |
| 4,266,249 | 5/1981 | Chai et al. | 358/429 |
| 4,546,383 | 10/1985 | Abramatic et al. | 358/85 |
| 4,591,907 | 5/1986 | Catros | 358/136 |
| 4,613,894 | 9/1986 | Catros | 358/13 |
| 4,630,125 | 12/1986 | Roetling | 358/458 |
| 4,654,484 | 3/1987 | Reiffel et al. | 379/53 |
| 4,667,247 | 5/1987 | Karow | 358/455 |
| 4,703,348 | 10/1987 | Yuasa et al. | 358/133 |
| 4,713,688 | 12/1987 | Güttner | 358/141 |
| 4,717,957 | 1/1988 | Santamaki et al. | 358/136 |
| 4,758,893 | 7/1988 | Lippel | 358/133 |
| 4,766,499 | 8/1988 | Inuzuka | 358/283 |
| 4,816,901 | 3/1989 | Music et al. | 358/13 |
| 4,821,119 | 4/1989 | Gharavi | 358/136 |
| 4,967,272 | 10/1990 | Kao et al. | 358/135 |

FOREIGN PATENT DOCUMENTS

| | | | |
|---|---|---|---|
| 30914/84 | of 0000 | Australia . | |
| 2141895 | 1/1985 | United Kingdom | 358/457 |

OTHER PUBLICATIONS

Pratt, *Digital Image Processing*, pp. 593–598.
Ochi et al., "A New Halftone Reproduction and Transmission Method Using Standard Black and White Facsimile Code" (1987), vol. COM–35, pp. 466–470.
Gharavi, "*Conditional Run–Length and Variable–Length Coding of Digital Pictures*" (1987), vol. COM–35, No. 6, pp. 671–677.

(List continued on next page.)

*Primary Examiner*—Edward L. Coles, Sr.
*Assistant Examiner*—Thomas D. Lee
*Attorney, Agent, or Firm*—Hamilton, Brook, Smith & Reynolds, P.C.

[57] ABSTRACT

Differential image data compression systems and techniques are disclosed for use in video telephone systems for full duplex, real time transmission of audio and video images over nominal 3 kHz residential telephone lines and other narrow bandwidth channels. Each video telephone device consists of a transmitting portion and a receiving portion. In the transmitting section a reduced grey-scale (luminance) image, preferably consisting of only black-and-white pixels, is compared in an image processing module with a similarly reduced image derived from previous values to determine pixel positions that have changed. Information representative of the changes is then encoded and modulated and (time or frequency) multiplexed with the audio and/or chrominance signals for transmission. At the receiver, the incoming signal is demodulated and demultiplexed to separate the audio and video portions, the image portion is decoded and the luminance value is updated by an image updating unit. Adaptive resolution, pixel averaging and interpolation techniques are also disclosed for picture enhancement.

43 Claims, 8 Drawing Sheets

OTHER PUBLICATIONS

Lin and Costello, *"Error Control Coding Fundamentals and Applications"*, (1983), pp. vii–xi, and 257–295.

Hecht et al. *"Delay Modulation"* (1969), vol. 57, pp. 1314–1316.

Kim et al., *"Video Telephone: Gone Today Here Tomorrow?"* (1986), vol. 15, No. 12, pp. 124–128, 131–132 and 135–136.

Mosley, *"Widespread Graphics Use Spawns Diversity In Data–Compression Devices"* (1988), pp. 87–94.

Mitsubishi, *"Affordable Picturephone"* (1989), p. 26.

Mitsubishi, *"Now, The Telephone Lets You See Who's Talking"* (1989).

Image Data Corporation, *"The Photophone"* (1989).

Eckhouse, *"Facing The Phones"* (1987), pp. 48–51.

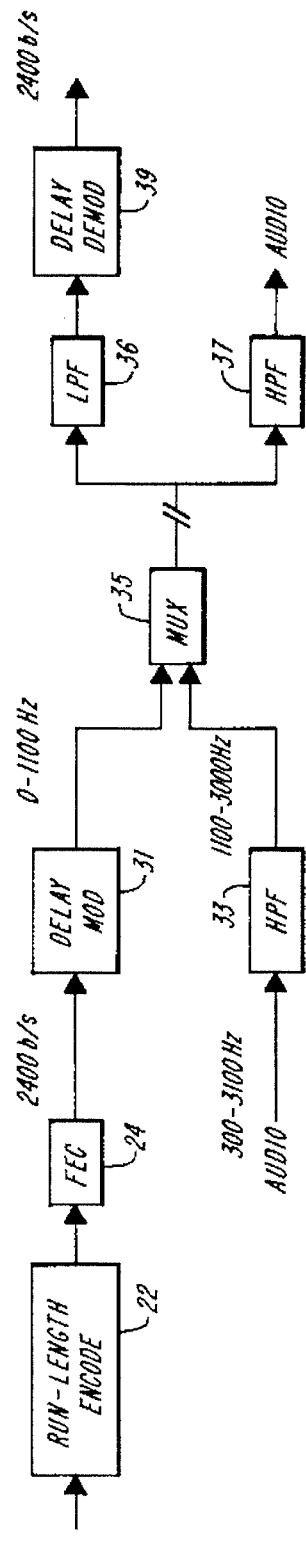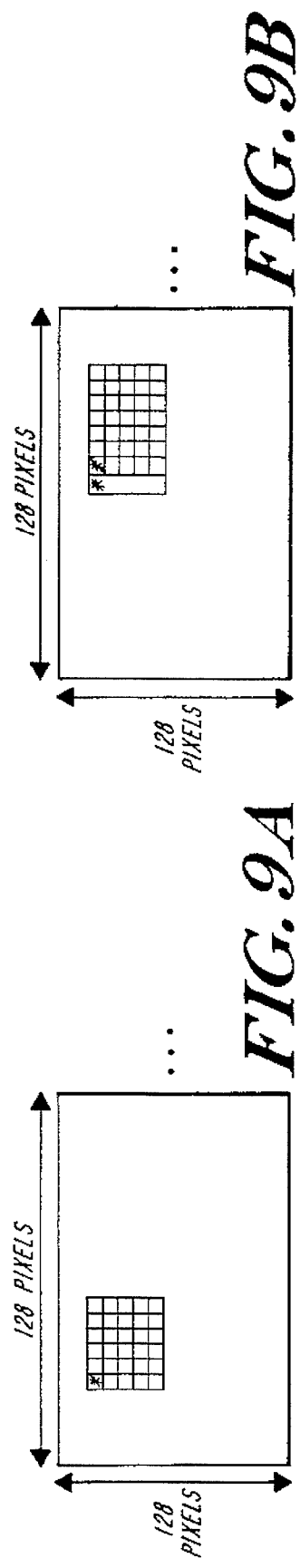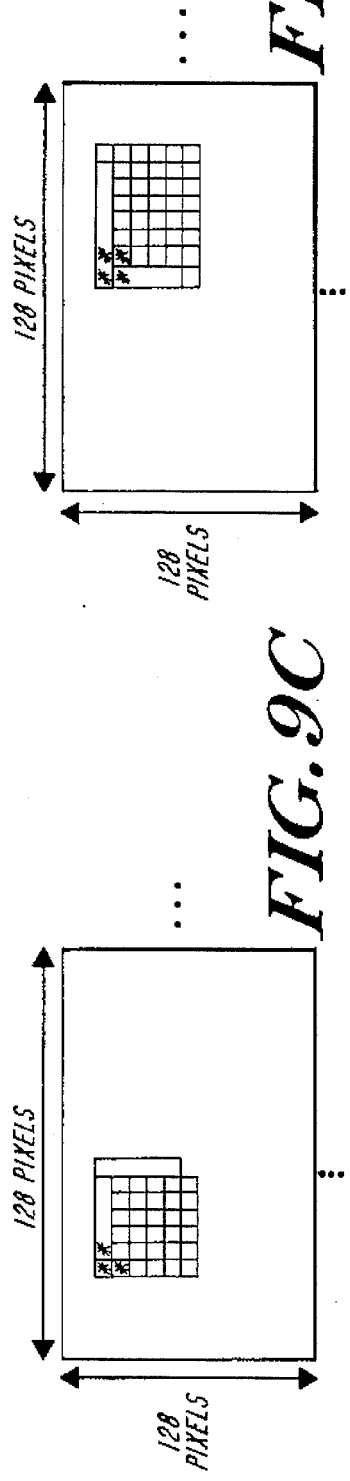

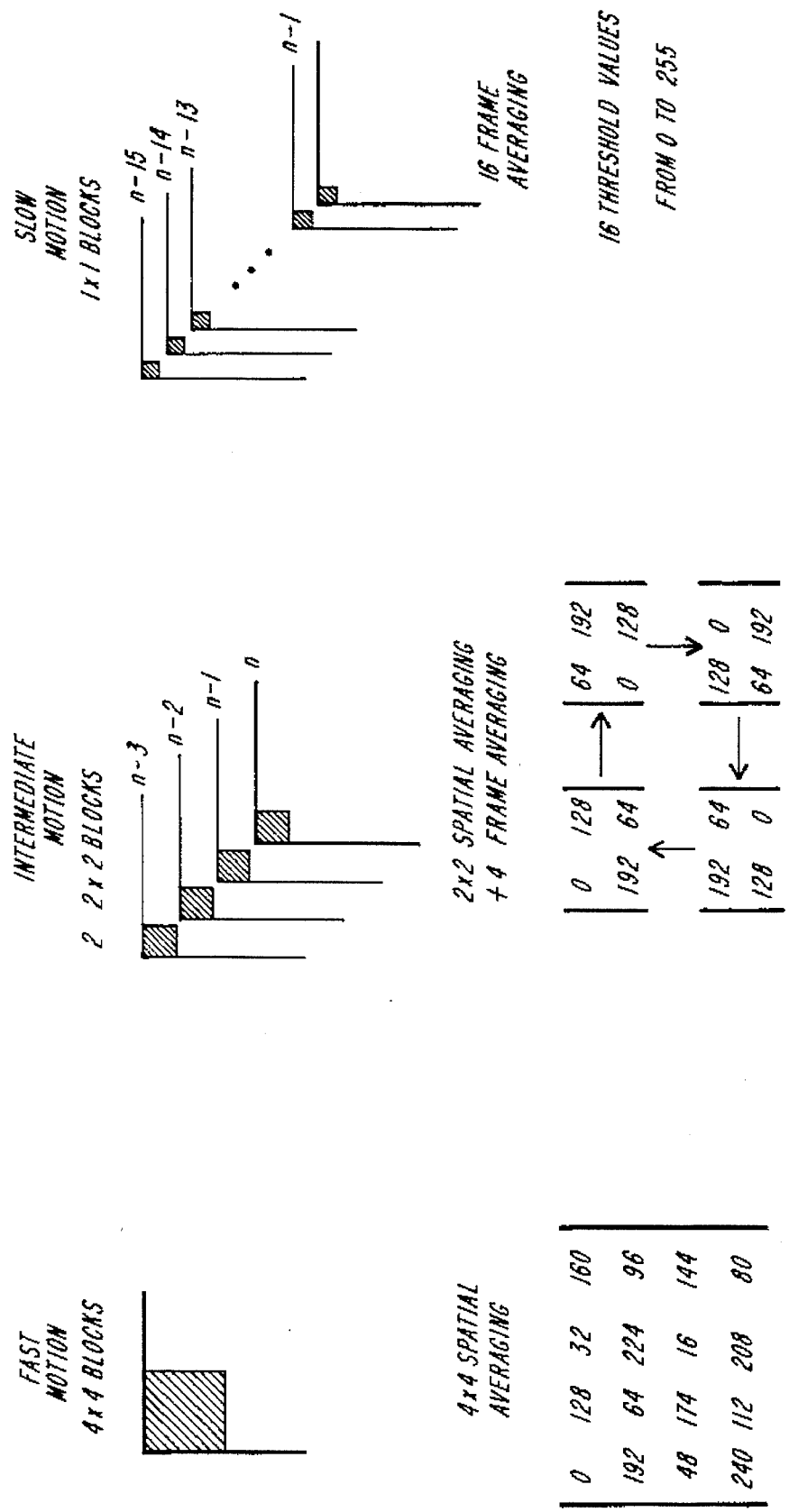

VIDEO TELEPHONE SYSTEMS

This invention was made with Government support under Contract No. F19628-85-C-0002 awarded by the Department of the Air Force. The Government has certain rights in the invention.

REFERENCE TO RELATED APPLICATION

This application is a continuation of application Ser. No. 07/635,986, filed Dec. 26, 1990, which is a Continuation-in-Part of Ser. No. 07/458,282, filed Dec. 28, 1989, both now abandoned.

BACKGROUND OF THE INVENTION

The technical field of this invention is image processing and, more specifically, differential motion detection processes and devices. In particular, the invention relates to video telephones for transmitting both sound and images in real time over standard residential telephone lines.

When video conferencing was first demonstrated at the New York World's Fair in 1964, public expectations were raised that a new technology would soon render the telephone obsolete. However, various technical constraints have made video telephone systems prohibitively costly to all but a relatively small group. In particular, the amount of image data that must be transmitted has posed a most significant problem because such data far exceeds the capacity of existing standard residential telephone networks.

Researchers have attempted to overcome this obstacle in two ways: first, by using a different medium for data transmission to enable a higher data transfer rate; or second, by using image data manipulation techniques to compress the amount of data required to represent the image. This invention primarily is concerned with the latter approach of data compression.

Much of the work on video conferencing has been directed toward data transmission over special, high-quality transmission lines, such as fiber optics, which are capable of transmitting at least several times as much data as standard residential telephone lines. For example, an Integrated Switched Digital Network (ISDN) service is being implemented with a 64 kbit/sec. video transmission rate to replace, in some instances, the standard 3 kHz telephone lines that can handle at best up to about 20 kbit/sec., depending upon the signal processing employed. These special lines are relatively costly and currently are available only in limited areas.

An object of this invention is to provide an image data compression process to enable video telephones to be used over the present, copper-based, residential telephone network, as well as other low bandwidth transmission media.

Another object of this invention is to provide an inexpensive video telephone that may be used with standard video cameras and video display screens or personal computers to provide videoconferencing capabilities between users connected to the standard residential telephone network.

SUMMARY OF THE INVENTION

Differential motion detection data compression systems and techniques are disclosed for use in low-cost, video telephone systems for full duplex, real time transmission of audio and video images over nominal 3 kHz residential telephone lines and other low bandwidth channels.

Each video telephone device consists of a transmitting portion and a receiving portion. In a simple "black-and-white" embodiment, the transmitting section transforms an image (e.g., either from a standard video camera or an alternative imaging device such as a charge coupled device or CCD) into a reduced grey-scale image preferably consisting of only black-and-white pixels. This image is then compared with a similarly reduced image derived from previous image data to determine pixel positions that have changed. Information representative of the changes between image frames is then encoded to further compress the data and then modulated and multiplexed with the audio signal for transmission over a standard 3 kHz telephone line.

In another embodiment, color images can be transmitted by decomposing the color video signal into its luminance and chrominance components and then processing the luminance values in accordance with this invention. As used herein, the term "grey-scale image" is intended to encompass both simple "black-and-white" images and the luminance component of color images. Techniques for encoding and transmitting the chrominance values of color images, as well as reconstruction of a color image from the luminance and chrominance information, will be described below.

Coherent modulation/demodulation can be used to enable transmission and reception of the video and audio signals over a standard residential telephone line. Coherent modulation produces frequency transformations of the signals to position the signal bandwidth in the telephone line channel, nominally, 0 to 3 kHz. The coherent modulation also is used to enable multiplexing two analog signals simultaneously onto the telephone line bandwidth, as described in more detail below. Techniques for reducing crosstalk between the transmitted audio and video signals, as well as alternative frequency division multiplexing techniques for transmittal of the audio and video signals, are also disclosed below.

In another aspect of the invention, adaptive resolution apparatus and methods are disclosed in which different data compression techniques are used, depending on the degree of motion in the image over time. In one illustrated embodiment, three states (fast motion, intermediate motion and slow motion) are defined and different data processing steps practiced in the transmitter based on the state determination.

The receiving section reverses the data compression process of the transmitting section. The incoming signal is demodulated and demultiplexed to separate the audio and video portions, the image portion is decoded, and the reduced grey-scale image of the previous frame is updated accordingly. Prior to the display of the updated image, the image can be transformed from a reduced grey-scale state into a fuller grey-scale image or a reconstructed luminance signal by overlapping and averaging blocks of pixel values.

When chrominance information is also encoded, various transmission schemes can be employed. For example, luminance and audio information can be coherently modulated, as in the black-and-white case, but over a slightly narrowed bandwidth (e.g., over a 0–2500 Hz band with a first carrier frequency, $f_1$, and the I & Q color components can be coherently modulated in a second band (e.g., over 2500–3000 Hz band with a second carrier frequency, $f_2$). Alternatively, a luminance signal L and chrominance signals, e.g., $X_{red}$ and $X_{blue}$ color signals, can be multiplexed over time. In yet another approach, the color signals can be sampled over time and then time domain multiplexed over the audio channel.

The image data compression techniques of the present invention can be applied not only to video telephones and video conferencing systems but to graphic image storage devices, high definition television (HDTV), cable television, facsimile machines and computerized document storage on magnetic or optical disks. In addition, the images that can be processed vary from still, black-and-white characters to fast-moving, high-resolution color images of intricate objects.

The invention can also be adapted for image transmission over other narrow band media, such as radio transmissions, through the air. In addition, the invention can be adapted to transmit graphic images of text generated by a computer instead of a video camera. The video telephones of the present invention also are compatible with conventional telephones and can receive and/or transmit audio signals, alone, whenever communication with a regular telephone or other audio transceiver is desired. Likewise, the systems of the present invention can be used not only with analog signals produced by conventional TV cameras but also with the signals produced by imaging devices such as CCDs and the like. These features, as well as the addition, subtraction or substitution of other components, will be obvious to those familiar with the art.

It should also be noted that throughout this specification, the video telephone system has been described in terms of transmission via telephone lines having a nominal bandwidth from about 0 to about 3 kilohertz. However, telephone bandwidths actually are slightly offset from this range, typically operating from about 300 Hz to about 3.4 kHz. Those skilled in the art will appreciate this distinction and can readily adjust the parameters described herein to match actual conditions in use.

BRIEF DESCRIPTION OF THE DRAWINGS

FIG. 8 is a schematic illustration of an alternative modulation and demodulation approach for use in the present invention.

FIGS. 9A–9D illustrate an averaging process useful in the image averaging unit of the receiver of FIG. 1.

FIG. 11A is an illustration of a matrix of dithered threshold values for coarse resolution in the adaptive system of FIG. 10.

FIG. 11B is an illustration of a matrix of dithered threshold values for intermediate resolution in the adaptive system of FIG. 10; and FIG. 11C is an illustration of a matrix of dithered threshold values for fine resolution in the adaptive system of FIG. 10.

DETAILED DESCRIPTION

Figure 1:
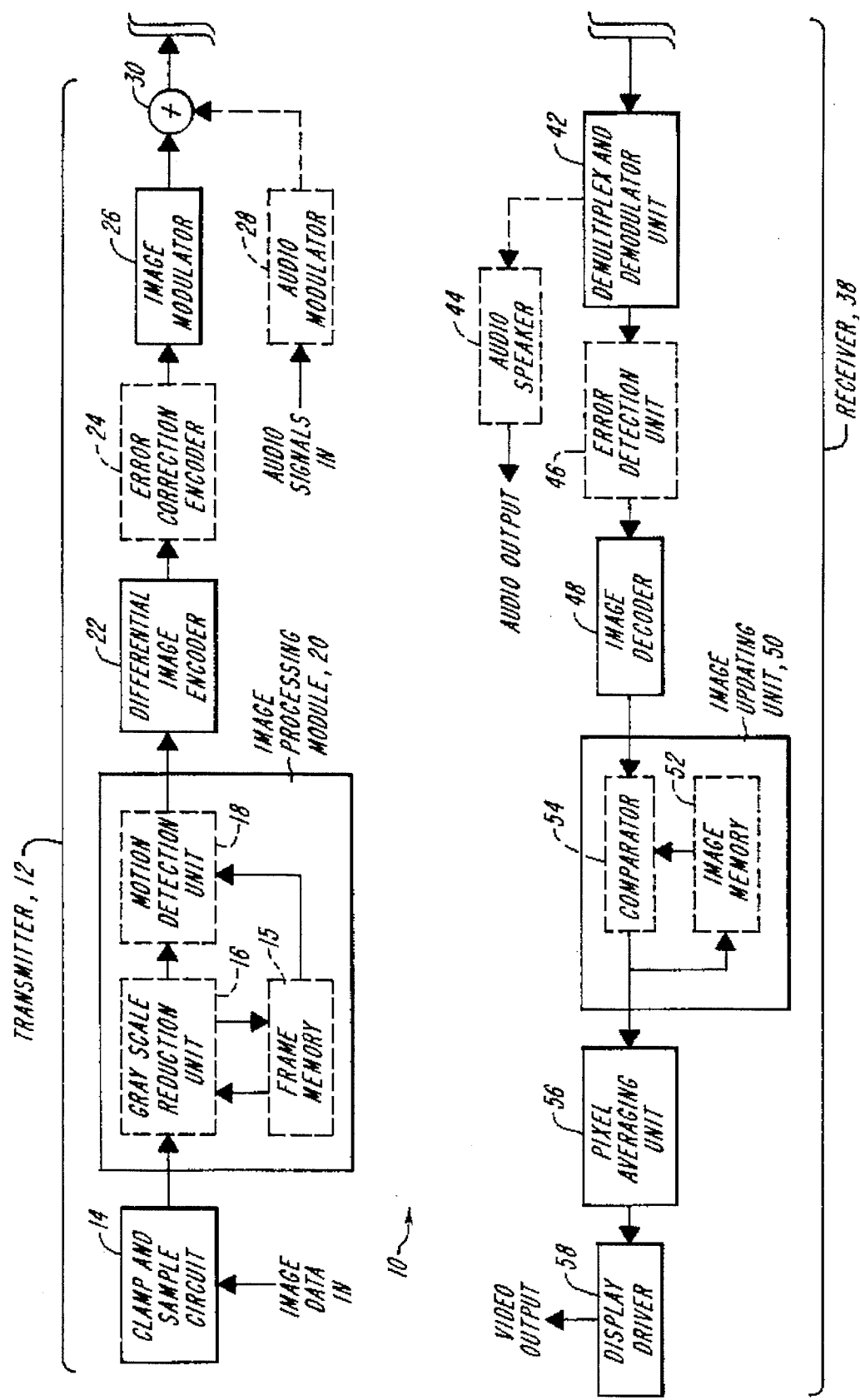
FIG. 1 is a schematic block diagram of a black-and-white video telephone system in accordance with the present invention.

In FIG. 1, a video telephone system 10 in accordance with the present invention is shown, including a transmitter section 12, having a sampling unit 14, an image processing module 20 (including a grey-scale reduction unit 16, a frame memory 15 and a motion detection unit 18), a differential image encoding unit 22, an optional error correction unit 24, an image modulator 26, an optional audio modulator 28 and a multiplexing mixer 30. System 10 further includes a receiver section 38 having a demultiplexing and demodulating unit 42, an optional speaker 44 for audio output, an optional error detector 46, an image decoder 48, an image updating unit 50 (including image memory 52 and comparator 54), a pixel averaging unit 56, and a display or monitor driver 58 for video output.

Image data is first compressed by the sampling and grey-scale reduction units 14 and 16, then compared with a previously reduced grey-scale image in the motion detection unit 18 to produce image data representative of the changes from the previous image frame. In the final stage, the differential image data is further compressed by the encoding unit 22, such that the image data may be modulated and transmitted over a 3 kHz or other narrow bandwidth channel.

The transmitted image data is received by the receiving section 38, as shown in FIG. 1, which reconstructs the new image. The receiving section 38 also has three levels of data decompression. After demodulation, the encoded image data is decoded by decoding unit 48 to provide the differential image, which is then used in the image updating unit 50 to make the designated changes to the previous image frame. Finally, the image is averaged in averaging unit 56 to yield a greater range of shades of grey which can then be displayed on monitor 58.

Figure 2:
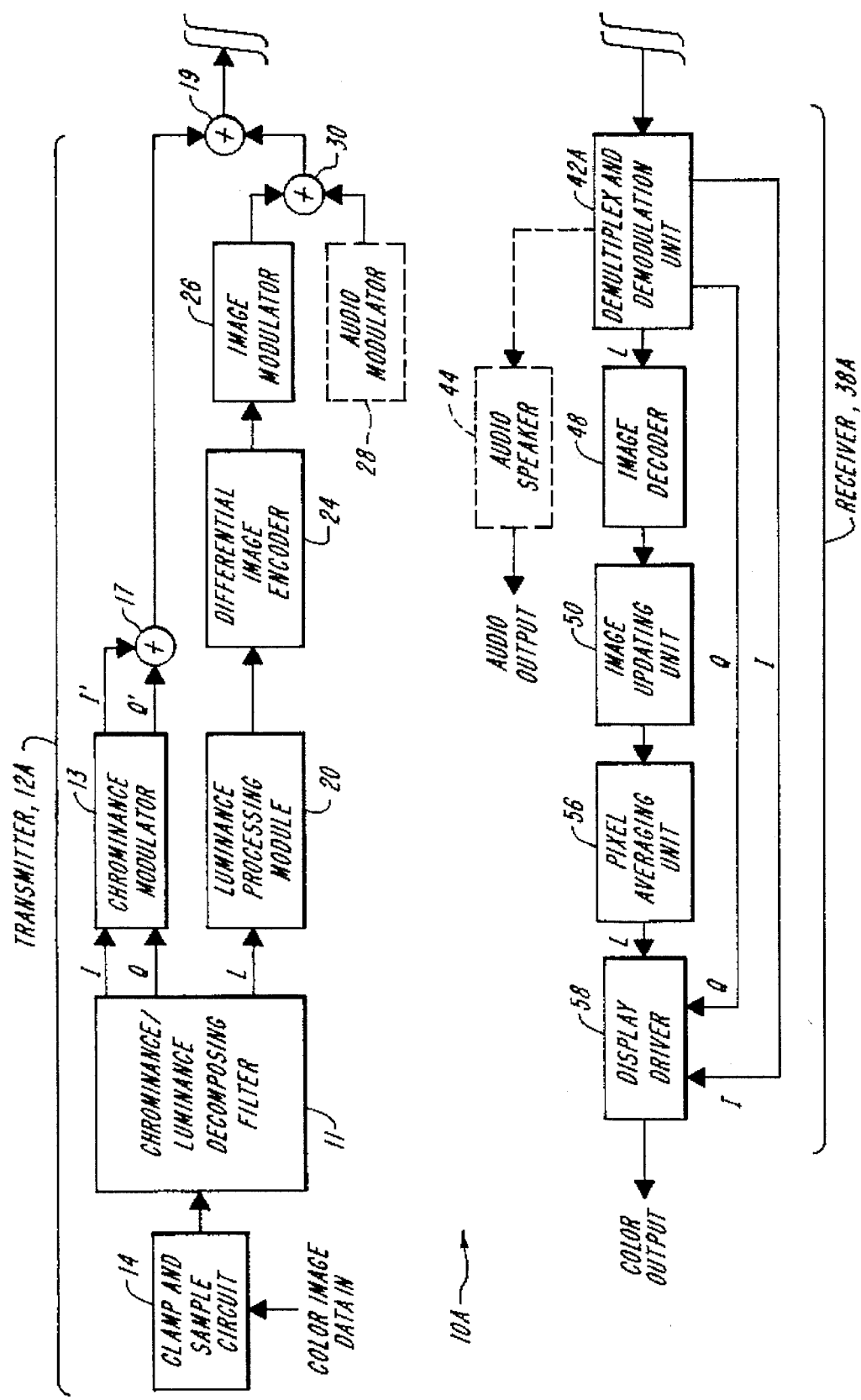
FIG. 2 is a schematic block diagram of a color video telephone system in accordance with the present invention.

In FIG. 2, an alternative system 10A is shown, including transmitter 12A and receiver 38A for incorporating color information, with like references characters indicating elements substantially similar in function to those shown in FIG. 1. System 10A includes filter 11 which decomposes a color (e.g., NTSC) video signal into its luminance component L and two chrominance components I and Q. The luminance component L can be processed by module 20, encoder 24 and modulator 26 in a manner substantially identical to the processing of a black-and-white image, as shown in FIG. 1. The luminance data can then be multiplexed with audio data via mixer 30 and transmitted over a portion of the bandwidth (e.g., a nominal frequency band ranging from about 0 to about 2500 Hz) while a second portion of the bandwidth (e.g., a nominal frequency bandwidth (e.g. a nominal frequency bandwidth from about 2500 to about 3000 Hz). The I and Q chrominance values can be modulated by modulator 13 and mixed together in mixer 17. The luminance/audio and chrominance data can then be multiplexed together via mixer 19 for transmission.

In the receiver 38A of FIG. 2, the luminance and chrominance values (as well as audio signals, if any) are demultiplexed and demodulated by unit 42, and the luminance data is decoded by decoding unit 48 to provide the differential image, which is then used in the updating unit 50 to update the image. Again, in a manner analogous to the process of FIG. 1, the luminance values can be averaged to yield a greater range of grey values, which are then inputted into display driver 58, together with the chrominance values to provide a color video output.

With reference again to FIG. 1, the image processing module 20 will be described in more detail. In the first level of data compression, the grey-scale reducing unit 16 transforms the image by reducing the number of grey levels for each pixel. The resultant image, when viewed by the human eye from a distance, has an appearance which is strikingly similar to the original image; however, it requires fewer bits of information. In one preferred embodiment, the transformation entails reducing an image having 256 shades of grey into two shades, white and black. This results in an 8-fold reduction in the data required to represent the image, as each pixel is converted from having an 8-bit grey-scale representation to a 1-bit representation.

To allow the compressed image data to appear as various shades of grey to the human eye, a dithering comparison, is employed. In one preferred embodiment, the grey value of each pixel is compared to a threshold value which varies with its pixel position. For grey values greater than the threshold, i.e., lighter in shade, the pixel value becomes 1, representative of pure white. For grey values less than the threshold, the transformed pixel value becomes 0, or pure black.

Different pixel positions have different threshold values which are selected to provide a proportional combination of black-and-white pixels such that when an area or block of pixels are viewed from a distance, the image appears the desired shade of grey. The selected threshold values produce a primarily white pixels for light shades of grey, and increasingly more black pixels per unit area for darker shades of grey. Various dithering methods known in the art can be employed in the present convention. See, for example, Ochi et al., "A New Halftone Reproduction and Transmission Method Using Standard Black & White Facsimile Code," Vol. COM-35, *IEEE Transactions on Communications*, pp. 466–470 (1987), herein incorporated by reference for further background materials on dithering methods.

In the second level of data compression, the compressed or dithered image is then compared in a motion detection unit 18 to the compressed image from the previous image frame, as stored in an image memory unit. The motion detection unit 18 detects which pixels have been changed between the two image frames and records the pixel locations. In one illustrated embodiment, pixel positions with no change have a value of 0, and those that have changed, either from white to black or black to white, have a value of 1. The new compressed image is then stored in the image memory unit for comparison with the next image frame.

In the third level of data compression, a differential image is next encoded in the differential image encoding unit 22 to further compress the data prior to transmission. In a preferred embodiment, run-length encoding is used, many versions of which are known in the art. In normal operation, the image will not change too much from frame to frame, leaving long series of 0 bits in the differential image. Run-length encoding represents various lengths (or runs) of consecutive 0's or 1's as code words. For example, in one embodiment, the shortest code words can be assigned to the most likely runs, effectively compressing the number of bits required to represent the data where there are long series of consecutive 0's or 1's. See, for example, Gharavi, "Conditional Run-length and Variable Length Coding of Digital Pictures," *IEEE Transactions on Communications*, pp. 671–677 (1987), incorporated herein by reference for further explanation of coding schemes.

The encoded differential image data is then ready for transmission over a narrow bandwidth channel, particularly a 3 kHz telephone line. However, additional optional coding techniques, such as toward error correction, may be conducted prior to transmission which will be described below.

The receiving section 38, shown in FIG. 1, (or the similar receiver 38A shown in FIG. 2), generally reverses and decodes the three levels of data compression as described in the transmitter but in the opposite order. In the first level of data decompression, the encoded differential image data is decoded in decoding unit 48 using the reverse process as used in the differential image encoding unit 22. In the preferred embodiment, this decoding process would reverse the selected run-length coding scheme.

In the second level of data decompression, the previous image frame as stored in the image 52 memory unit is updated by the differential image data in the image updating unit. For pixel positions in which a change occurred, represented by 1 in the preferred embodiment, the pixel value of the corresponding pixel position is changed. This would switch a black pixel to white and vice versa. For pixel positions in which the differential image value is 0, the pixel value of the corresponding pixel position remains unchanged.

In the third level of data decompression, the updated compressed or dithered image is partially restored to its original image with multiple grey-scales in the image averaging unit. The value of each pixel position is calculated by averaging the pixel values of all positions within a prescribed region.

In addition to the three levels of data compression and decompression, the invention may include an error code generator 24 and error detector 46, as shown in dotted lines in FIG. 1. This adaptation may be desirable for use over noisy transmission lines. One commonly-used error correction technique is forward error correction (FEC), in which redundant bits of data are added to the data stream in a specified manner, such that the FEC decoder on the receiving section can check for errors due to noise. See, for example, S. Lin and D. Costello, *Error Control Coding: Fundamentals and Applications* (Prentice-Hall, Englewood Cliffs, N.J. 1983) for a further description of FEC systems, incorporated herein by reference.

While the FEC method is a preferred technique, other error correction techniques can also be employed. For example, a joint modulation-coding scheme may be used to combine 24 and 26 into a single unit. At the receiver 38 a corresponding demodulation-decoding unit combining 42 and 46 would be used. Possible choices for this technique are tamed frequency modulation, continuous phase modulation, and trellis-code modulation. Other choices are obvious to those familiar with the art. These techniques provide noise reduction without increasing the signal bandwidth, but require more complexity.

Another optional element of the invention as shown in FIGS. 1 and 2 is the audio modulator 28 and mixer 30 for multiplexing an audio signal with the modulated image signal for simultaneous audio and video transmission. When an audio modulator and mixer are used, the receiving section 38 then separates the audio and video portions of the signal by an analogous demodulation and demultiplexing unit 42. While this combination is envisioned to be a highly desirable feature, particularly for video conferencing; it is not an essential element. For some applications, an audio portion may be superfluous or undesired.

Figure 3:
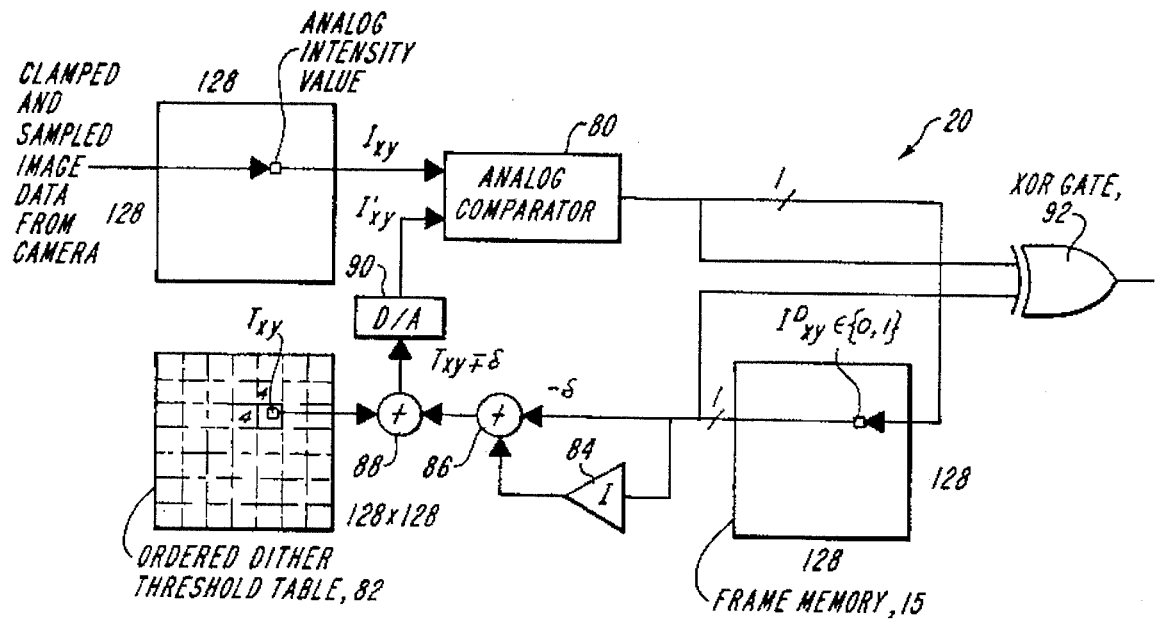
FIG. 3 is a more detailed schematic diagram of an image processing module for use in the transmitter of FIG. 1.

FIG. 3 shows the image processing module 20 of FIGS. 1 and 2 (the grey-scale reducing unit 16, the frame memory unit 15 and the motion detection unit 18) in greater detail. In particular, FIG. 3 illustrates an embodiment which includes an hysteresis-dithered, thresholding process for converting a multiple grey-scale image into a halftone image consisting of black-and-white pixels. The halftone image in turn is compared to that from the previous image frame to provide a differential image, which is further processed by the image encoding unit in the third compression stage.

As shown in FIG. 3, the image processing module 20 includes an analog comparator 80, an ordered dither threshold table 82, a frame memory 15, inverter 84, summer 86, summer 88, digital-to-analog converter 90 and an exclusive OR gate 92.

Inputs to the image processing module 20 of FIG. 3 are luminance values which can be derived from any standard video camera that converts an image into an NTSC or similar format (such as PAL or SECAM). The analog signal representative of the image from the camera is then passed through a clamp and sample circuit which provides the reduced analog image, which is an analog signal representative of an image screen of 128×128 pixels at a rate of 10 frames per second. This can be accomplished by sampling the NTSC signal 128 times per line and one time out of every four lines. The sampled pixel values from the analog signal are real numbers representative of an 8-bit grey-scale consisting of 256 shades of grey from pure black (0) to pure white (255).

While this is the preferred embodiment, it should be understood that the image size can be any N×K matrix of pixels, the frame rate may be varied, and any number of grey levels may be used. Such alternatives will be obvious to those familiar with the art; however, if the resolution is increased, the frame rate will generally have to be decreased to permit the image data to compress sufficiently to permit effective transmission of the real time image over a 3 kHz telephone line. Similarly, if the frame rate is increased, the image resolution will have to be decreased accordingly.

In an alternate embodiment, the camera, clamp and sample circuit may be replaced by a digital or analog storage device or other means for generating a digital or analog signal representative of an image.

The next stage of the process entails converting the sampled analog pixel values into 1-bit binary values representative of black or white. This is accomplished in comparator 80 by comparing the real value of each pixel with a threshold value, as stored in the ordered dither threshold table 82, as shown in FIG. 3. The table is a digital memory device representative of a shade of grey for each of the 128×128 pixel positions. Different pixel positions have different threshold levels to permit a grey area spanning a given group of neighboring pixel positions to be represented by combinations of black-and-white pixels to give the perception of the particular shade of grey when viewed from a distance. For example, for an 8-bit grey-scale spanning from pure black (0) to pure white (255), a medium dark grey of shade level 63 over a block of pixels would be converted into black-and-white pixels with about three times as many black pixels as white.

The output of the analog comparator 82 is stored in frame memory 15 and also used to "dither" the threshold values used to process the next frame. As shown in FIG. 3, a hysteresis-ordered, dither threshold is implemented by inverter 84 and summers 86 and 88 which operate to define a hysteresis band around each threshold value, $T_{xy} \pm \delta$, which serves to reduce flicker in the analog comparator 80.

Figure 4:
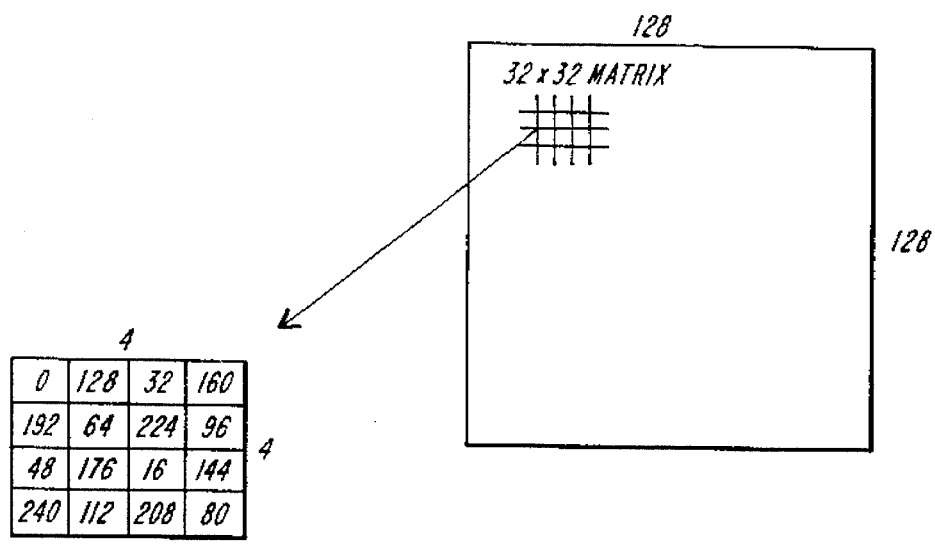
FIG. 4 is an illustrative matrix of dithered threshold values for a 4×4 block of pixels useful in a grey-scale reduction unit according to the invention.

A set of illustrative threshold values for the ordered dither threshold table are shown in FIG. 4. The 128×128 pixel image is broken down into 4×4 pixel blocks. There are 32×32 superblocks of these 4×4 blocks. The threshold values are selected to create a line-type dither pattern, which facilitates greater data compression in the preferred embodiment of the differential image encoding stage. As will be described below, a 1-dimensional, Modified Huffman run-length encoding scheme compresses data effectively where there is a long series of the same value.

For the example shown in FIG. 4, grey-scale 63 would result in alternating black-and-white pixels on the first row, all black pixels on the second row, alternative black-and-white pixels on the third row, and all black pixels on the fourth row. For a given 4×4 block, this results in 12 black pixels and four white pixels—exactly the desired 3-to-1 ratio. In addition, the efficiency of the run-length encoding will be maximized by this dithered pattern as every other row consists of continuous black pixels.

Figure 5A:
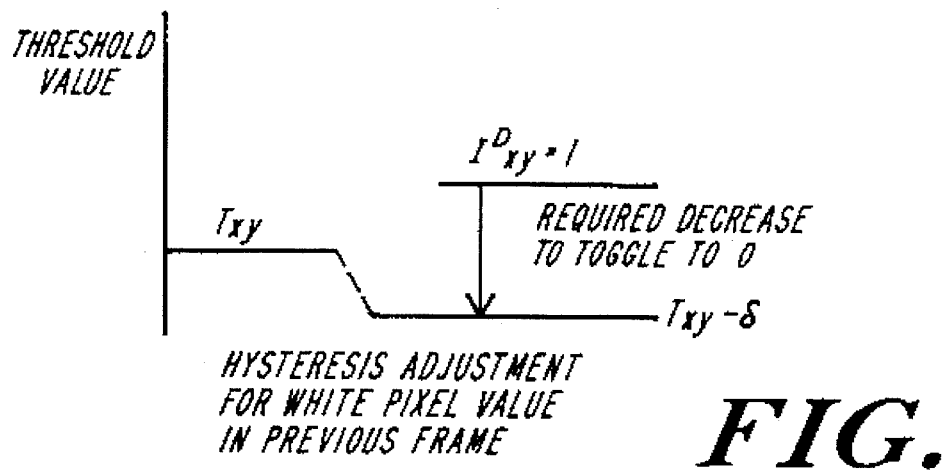
FIG. 5A illustrates a hysteresis process for adjusting the dithered threshold values in a grey-scale reduction unit to decrease toggling and image flickering for a white pixel value in a previous frame.
Figure 5B:
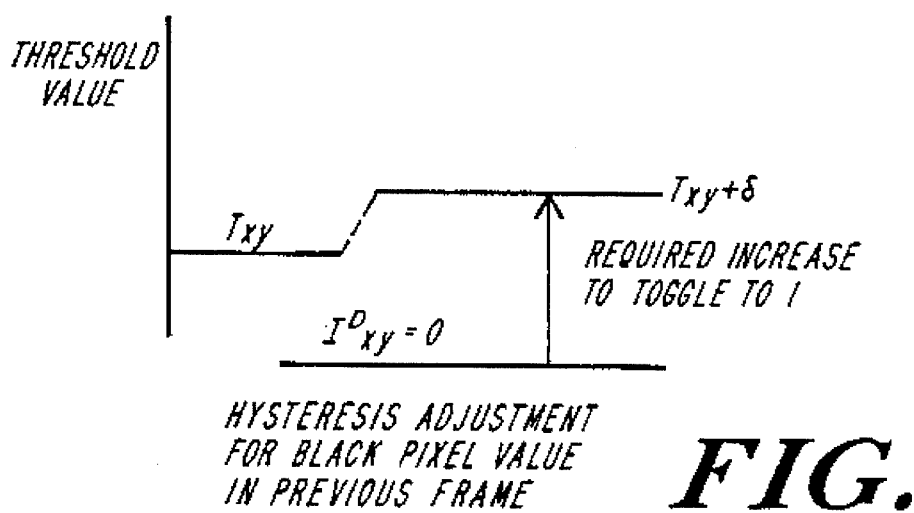
FIG. 5B illustrates a similar hysteresis adjustment for a black pixel value in a previous frame.

As noted above, to prevent unnecessary flickering of certain pixels from black to white between image frames, the preferred embodiment includes a hysteresis adjustment of the dithered threshold values. As shown in FIGS. 5A and 5B, the hysteresis adjustment increases the threshold value for a given pixel position if the corresponding pixel position in the previous image frame is black, and decreases the threshold value if the corresponding pixel position in the previous frame is white.

To illustrate this process, we return to the example of grey level 63, as applied to the ordered dither threshold table of FIG. 4. Note that the second position in the second row of the matrix has a threshold value of 64, which is very close to level 63. Minor fluctuations in the grey level that may occur between sampled image frames could result in the grey-scale oscillating between 63 and 65, for example, every tenth of a second, which would result in the grey level toggling between black-and-white every image frame. This would result in an unnecessary increase in the amount of data that would be transmitted to the receiving section. To prevent such unwanted toggling, each dither threshold is adjusted by a predetermined amount to ensure any change in shade is sufficient to warrant toggling of the pixel value.

Once the dither threshold values are adjusted with respect to the previous image frame, the new image is compared to the threshold values to transform the multiple grey-scale image into a halftone image. As shown in FIG. 3, the adjusted dithered threshold value is converted from digital to analog in a D-to-A converter 90 and sent along with the reduced analog image to the analog comparator 80. Each reduced analog pixel value that is greater than the adjusted analog threshold value becomes a digital output of 1 or white; each reduced analog pixel value that is less than the adjusted analog threshold value becomes a digital output of 0 or black. The analog comparator 80 also converts the compared results into digital values for each pixel.

The digital output from the analog comparator 80, i.e., the first level compressed image, is simultaneously sent to the frame memory 15 and to the motion detection unit 18, which is shown in FIG. 3 as being an XOR gate 92 for 1-bit adding of the halftone pixel values generated by the D-to-A analog comparator and the halftone pixel values of the previous halftone image frame as stored in the frame memory. For pixel values that did not change between frames, the output of the XOR gate is 0. For pixel values that changed between frames, the output of the XOR gate is 1. These values are then sent to the differential image encoding unit.

As the digital output of the analog comparator 80 is sent to the XOR gate 92, this data is also sent to the frame memory 15 to replace the currently-stored pixel values. The new digital values representative of the halftone image replaces the old values in the frame memory 15 representative of the previous halftone image frame. This updates the frame memory 15 for processing of the next frame in time.

The final data compression stage is the differential image encoding scheme, as shown in FIG. 1. The preferred embodiment is a 1-dimensional Modified Huffman run-length code. This encoding scheme transforms long series of 0 or 1 bits into shorter codes. Integrated circuits for implementation of such encoding techniques are commercially available, e.g., the AM7971 compression-expansion processor chip (Advanced Micro Devices, Inc., Sunnyvale, Calif.). Alternative embodiments may be substituted for the 1-dimensional Modified Huffman code, such as the 2-dimensional Modified Huffman code, and other variations.

Figure 6:
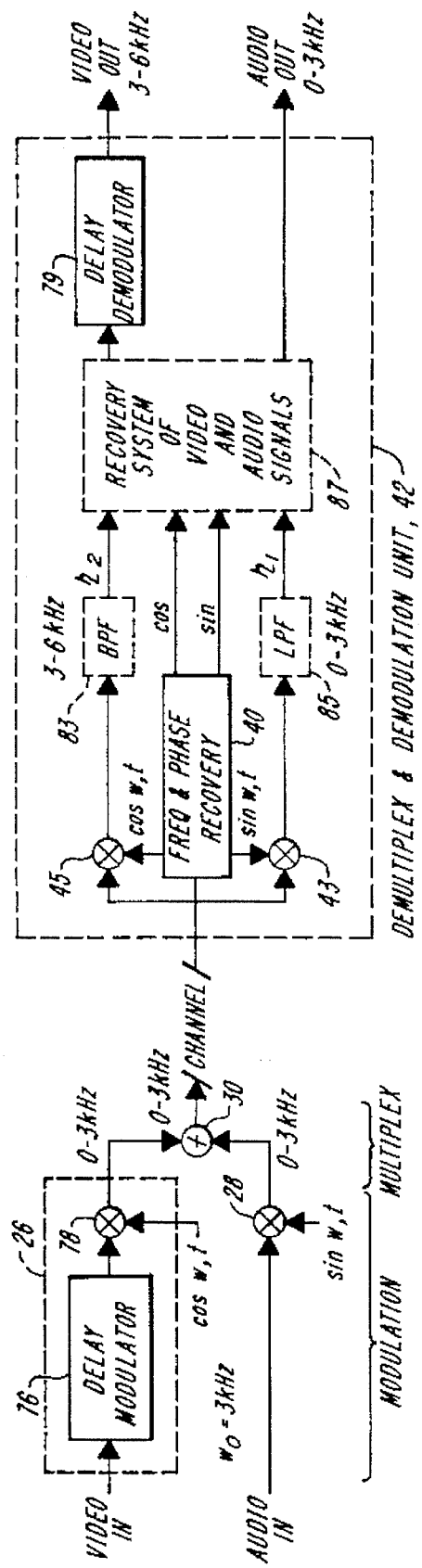
FIG. 6 is a more detailed schematic diagram of the modulation and multiplexing elements of the transmitter and the demodulation and demultiplexing elements of the receiver of the system of FIG. 1.

The encoded differential image values may either be directly sent over a transmission line or multiplexed and modulated with audio portion for simultaneous transmission over the same bandwidth. FIG. 6 illustrates this process.

The video signal from the encoder is processed by image modulating module 26 comprising a delay modulator 76 and mixer 78. The incoming video signal, essentially a binary bit stream, is converted into a rectangular waveform of two levels according to the following rules: a transition from one level to the other level is placed at the midpoint of the bit cell when the binary data contains a one. No transition is used for a zero unless it is followed by another zero, in which case the transition is placed at the end of the bit cell for the first zero. The resulting waveform is then low pass filtered to remove higher harmonics and yields an analog signal which lies within the 0–3 kHz range. For further details on delay modulation, see, Hecht et al., "Delay Modulation", Vol. 57, *Proc, IEEE* (*Letters*), pp. 1314–1316 (July, 1969). The processed video portion is then modulated by a cosine function to permit coherent (in-phase and quadrature) modulation and added to the audio portion, which is similarly modulated with a sine function.

On the receiving end, a frequency and phase recovery unit 40 detects and tracks the phase at which the signal arrives; and demodulators 43, 45 separate the sine and cosine components of the signal, providing an audio and a video signal. The video signal is then further processed by a delay demodulation 79 to recover the original binary bit stream.

After demodulation, the process of decoding the image in the receiver is essentially the reverse of that described above, with the exception of grey-scale recovery. Instead, a pseudo grey-scale is achieved by averaging individual pixel values with their neighbors.

Alternatively, demultiplexing and demodulation unit 42 can also include filter elements 83 and 85 and a video/audio recovery module 87 (shown in dotted lines in FIG. 6) to suppress cross talk. The output of low pass filter 85 is an audio signal $r_1$ and the output of high pass filter 83 is a video signal $r_2$.

The signals $r_1$ and $r_2$ contain the transmitted audio and video signals plus additional cross-talk terms. They have the form $$r_1 = s_{audio} + T_1[s_{video}]$$

$$r_2 = s_{video} + T_2[s_{audio}]$$

The functions $T_1[s_{video}]$ and $T_2[s_{video}]$ are the cross-talk terms. If they were absent, $r_1$ would be the audio signal and $r_2$ would be the video signal. $T_1[]$ and $T_2[]$ are tranformations defined by the processing steps carried out between the transmitter and the receiver. Thus, the transform functions encompass the filtering as well as the multiplication operations (e.g., multiplication by the carrier and its quadrature) that occur during modulation and multiplexing.

Given $r_1$ and $r_2$, the above equations can be solved for the audio and video signals. A practical method is to use recursion. Rewriting the equations in recursive form yields:

$$\hat{s}_{audio} = r_1 - T_1[\hat{s}_{video}]$$

$$\hat{s}_{video} = r_2 - T_2[\hat{s}_{audio}]$$

where ^ indicates an approximation.

Figure 7:
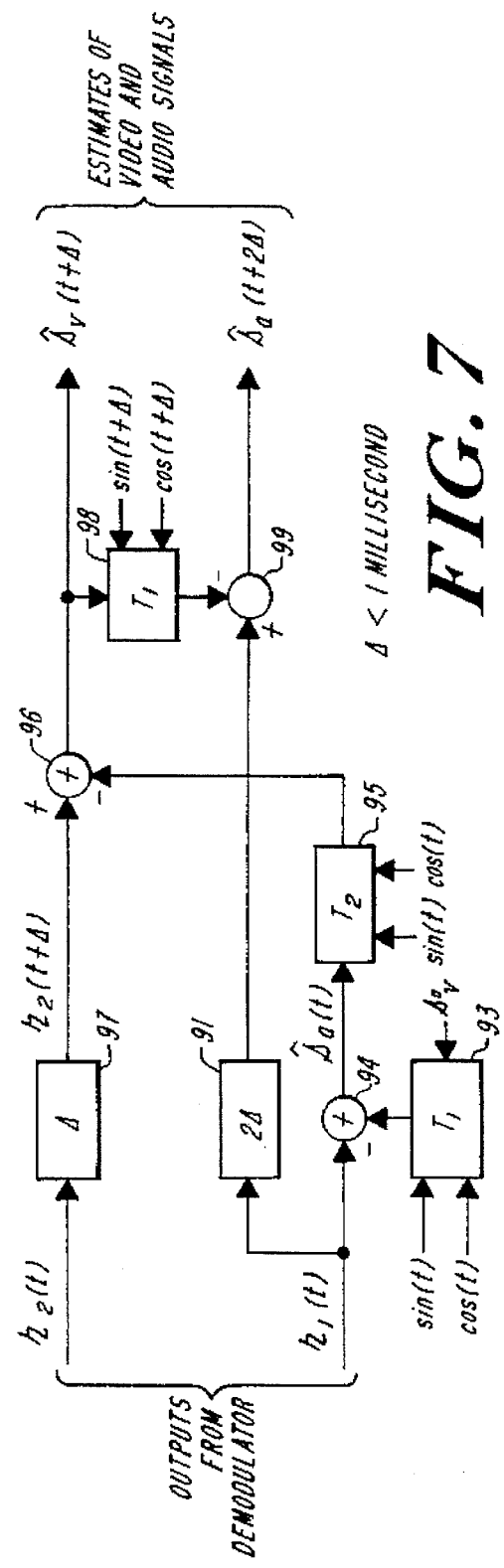
FIG. 7 is a schematic illustration of a system for suppressing cross-talk between the video and audio signals in a system, such as shown in FIG. 6.

A three-step recursive process can be used to recovering the audio and video signals, as shown in FIG. 7. In the first step, an initial estimate of $s_{audio}(t)$ is produced by applying the transform function $T_1$ to an initialization value of $s_{video}(t)$ in element 93. This initial value $s^o$ can be obtained from a previous image frame (with an appropriate delay) or, during start-up, from an initialization signal. The transform $T_1[s_{video}(t)]$ is then subtracted from $r_1$ in summer 94 to obtain the initial estimate of $s_{audio}(t)$.

In the second step, an estimate of $s_{video}(t+\Delta)$ is produced, by applying the transform function $T_2$ to the estimate of $s_{audio}(t)$ (obtained in step one) in element 93 and then subtracting this transformed signal from $r_2(t+\Delta)$ in summer 96. The delayed signal, $r_2(t+\Delta)$ is obtained by passing the received video signal $r_2$ through delay element 97. The factor $\Delta$ compensates for time delays inherent in the transformations $T_1$ and $T_2$. (Although these delays may be different, for purposes of illustration they are assumed to be the same.) The output of summer 96 is an estimate of video signal, $s_{video}(t+\Delta)$.

In the third step, $s_{audio}(t+2\Delta)$ is produced by applying a delayed transform of $T_1$ to the estimate of $s_v(t+\Delta)$ in element 98 and then subtracting this tranformed signal from $1(t+2\Delta)$ in summer 99 to yield a refined audio estimate $s_{audio}(t+2\Delta)$. (Further recursions can be implemented if desired to obtain more refined estimates of the audio and/or video signals.)

The results of step two and three are the outputs of the recovery system. The time delay, $\Delta$, associated with T1 and T2 is less than one millisecond, a delay which is normally imperceptible to the users.

In FIG. 8, an alternative modulation apparatus is shown including data encoder 22, error corrector encoder 24, delay modulation 31, audio high pass filter 31, and mixer 35, in the transmitter section and filter elements 36, 37 and delay demodulator 39, in the receiver section. This amplified system is based on the observation that the necessary video data rate for normal use of a video telephone (e.g., without handwaving or gross head movements) is about 2,400 bits per second (b/s). The delay modulator for a 2,400 b/s input stream can produce an analog signal in a band ranging from 0 to about 1100 Hz.

By filtering the audio signal to the portion of the bandwidth above 1100 Hertz, the audio and video signals can be frequency division multiplexed (FDM). That is, the video signal lies in the 0 to 1100 band. The audio signal lies in the 1100 to 3000 (or higher) band. The loss in audio signal-to-noise would be about 25 percent on dB, which is tolerable over most telephone channels.

The video signal in the 0 to 1100 band can also be moved to another part of the band by modulation. Such a relocation of the video signal may be desirable to reduce its effect on the voice quality (insofar as much of the energy in normal voice signals lies below 2000 Hz.) For example, by modulating with a 1000 Hz carrier, the video can be moved to the 1300 to 2100 band. A carrier recovery system, similar to that discussed previously, can then be used to synchronize the transmitter and receiver for demodulation.

For the case of color transmissions, the frequency bandwidth can be further divided to provide a first band for chrominance information, a second band for luminance information and a third band for audio information. For example, color information can be transmitted over a narrow band of nominal frequency from 0 to 500 Hz. The selection of particular frequency ranges for such bands is within the ordinary abilities of those skilled in the art.

Various other modulation techniques can also be practiced in accordance with the invention. For example, all of the signals (or a subset, such as chrominance and luminance information, can be multiplexed over time, rather than frequency. Thus, one can time sample the L, $X_{red}$ and $X_{blue}$ signals in frequency and send the three images on a rotating basis. Alternatively, one can time sample the color I and Q signals and transmit them using time-domain multiplexing over the audio channel.

The advantage of this scheme is simplicity. FIG. 4 shows a block diagram. The disadvantage is its loss of audio signal-to-noise ratio and its limitation in tracking motion in the video image. There may be applications where these disadvantages are unimportant.

FIGS. 9A–9D illustrate an image averaging process useful in the image averaging unit 56 of receiver 38 shown in FIG. 1. In the illustrated embodiment, 5×6 blocks of pixel values are averaged with the averaged value being applied to the pixel situated in the upper left hand corner of the block. This provides 30 shades of grey. In FIG. 9A, an initial pixel value is averaged; in FIG. 9B, the pixel in the next column is averaged using a 5×6 matrix of pixel values, which is displaced one column to the right. In FIG. 9C, a pixel in the next row relative to the pixel illustrated in FIG. 9A is shown. This pixel is averaged using a 5×6 matrix of pixel values which is displaced one row downward relative to the matrix of FIG. 9A. Similarly, in FIG. 9D, the averaging process is illustrated for a pixel one row below and one column to the right of the original pixel shown in FIG. 9A.

Various other picture "enhancement" techniques can also be employed in the image averaging unit 56 to reduce the "blockiness" of the picture. For example, spatial filtering techniques can be used to average pixel values across a line or from one line to the next. Moreover, as discussed in more detail below, in some cases it is also possible to average pixel values over time (i.e., from one frame to another) to further enhance image quality.

Additionally, interpolation techniques can be used to "fill-in" additional data values (e.g., intermediate values between pixels or between lines). With reference again to FIG. 1, the pixel averaging unit 56 in transmitter 38 can further include means for interpolating pixel values to improve the resolution of the reconstructed image. The effect of such interpolation is to smooth out the discontinuities in the reconstructed image, provide a subjectively more pleasing image and allow the use of a larger display at the receiving end. These interpolation functions can take place entirely at the receiving end. No modification is required at the transmitter.

In the illustrated embodiments, the original scene is described by N samples per line and M lines per frame, corresponding the M×N picture elements or pixels per frame. For instance, possible choices for M and N are M=90 samples per line and N=128 lines per frame, for a total of 90×128=11,520 pixels per frame. For each frame, the receiver calculates the luminance levels at each of the M×N pixels.

The pixel averaging unit 56 can further include a resolution multiplier which introduces additional interpolation points or pixels in the reconstructed signal, specifically, between any two consecutive pixels in a same row or in a same column. When one interpolation point is added between any two original pixels, the total number of pixels per frame is multiplied by 4.

For the purpose of illustration, assume in the description that only one pixel is added between any such horizontal or vertical pair, and consider arbitrary rows $R_i$, $R_{i+1}$ and $R_{i+2}$, and Columns $C_j$, $C_{j+1}$ and $C_{j+2}$ in the reconstructed picture. Let us call $P_{ij}$ the pixel at the intersection of row $R_i$ and column $C_j$. In one embodiment, the resolution multiplier can proceed as follows:

In step one, interpolated columns are generated. On row $R_i$, a new pixel, $P_{i,j+\frac{1}{2}}$, is added halfway between pixels $P_{ij}$ and $P_{i,j+1}$. Its luminance, $b_{i,j+\frac{1}{2}}$, is equal to:

$$a\, b_{ij} + (1-a)\, b_{i,j+1}, \text{ if } b_{i,j+2} > 2\, b_{i,j+1} - b_{ij}$$

$$\tfrac{1}{2}\, b_{ij} + \tfrac{1}{2}\, b_{i,j+1}, \text{ if } b_{i,j+2} = 2\, b_{i,j+1} - b_{ij}$$

$$(1-a)\, b_{ij} + a\, b_{i,j+1}, \text{ if } b_{i,j+2} < 2\, b_{i,j+1} - b_{ij}$$

where a is a selectable parameter which can range typically from 0 to about ½. One suitable value of a is ¼.

This procedure can next be repeated for all values of j (j=1, . . . , M) within row $R_i$, and for all values of i (i=1, . . . , N). This results in the creation of new columns, $C_{j+\frac{1}{2}}$, located between $C_j$ and $C_{j+1}$ over the whole display, thereby doubling the number of columns.

In step two, a similar process can be employed to interpolate rows. On column $C_j$, a new pixel, $P_{i+\frac{1}{2},j}$ is added half way between pixels $P_{ij}$ and $P_{i+1,j}$. Its luminance, $b_{i+\frac{1}{2},j}$, is equal to:

$$a\, b_{ij} + (1-a)\, b_{i+1,j}, \text{ if } b_{i+2,j} > 2\, b_{i+1,j} - b_{ij}$$

$$\tfrac{1}{2}\, b_{ij} + \tfrac{1}{2}\, b_{i+1,j}, \text{ if } b_{i+2,j} = 2\, b_{i+1,j} - b_{ij}$$

$$(1-a)\, b_{ij} + a\, b_{i+1,j}, \text{ if } b_{i+2,j} < 2\, b_{i+1,j} - b_{ij}$$

Again, a is a selectable parameter (e.g., a=¼). When step two is repeated for all possible values of i and j, it results in an overall doubling of the number of rows of each frame.

After the enhancement has been completed, the number of pixel values per frame is 4 MN consisting of MN original pixel values, and new 3 MN interpolated pixel values. This enhancement process can be repeated any number of times. It will result each time in a quadrupling of the number of pixels values within each frame.

Figure 10:
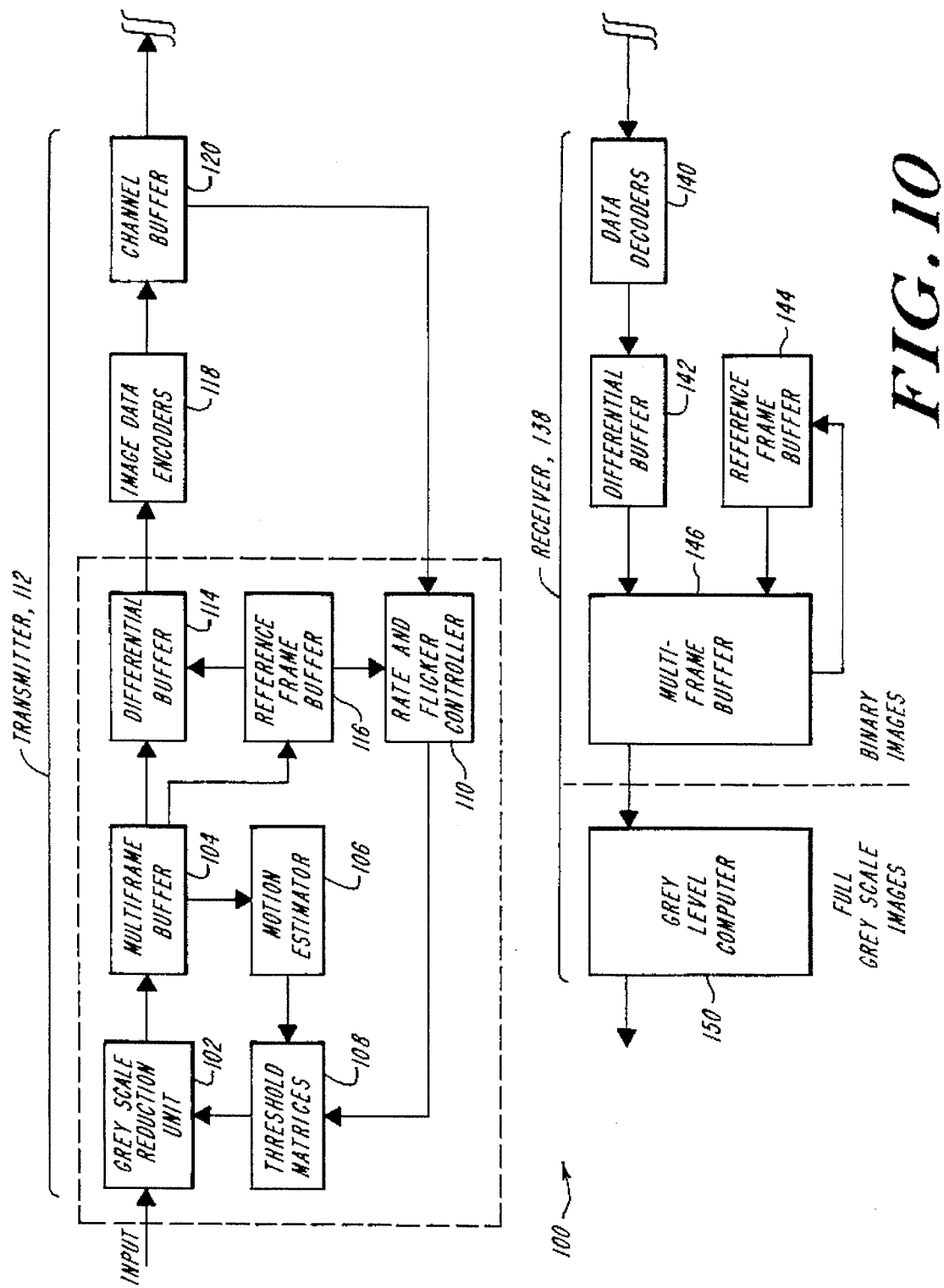
FIG. 10 is a schematic block diagram of a video telephone system employing an adaptive resolution module.

In FIG. 10, a system 100 is shown that provides for adaptive resolution in image processing. Adaptive resolution provides a means to enhance the resolution of the received picture depending upon the degree of motion existing in the original scene. For example, when there is animated motion in the scene (e.g., rapid head movement during a videophone conversation), the basic resolution techniques described above can be applied. However, when there is slow motion in the original scene (i.e., the face is not moving very much), a different protocol is employed. Finally, when there is no motion (i.e., either there is no motion at all, or the amount of motion is very small), yet another motion detection approach is taken.

As shown in FIG. 10, system 100 includes a transmitter section 112 having a grey-scale reduction unit 102, a multi-frame buffer 104, a motion estimation unit 106, a threshold look-up table 108, differential image buffer 114, reference frame buffer 116, image date encoders (e.g. run length and Huffman coding elements) 118, and channel buffer 120, as well as control circuit 110. The receiver 138 includes image data decoders 140, differential buffer 142, reference frame buffer 144, a multi-frame buffer 146, and a grey-scale computer 150.

In FIG. 10, the image data is compressed by the grey scale reduction unit 102 to yield binary luminance values. Unit 102 applies threshold matrices to the incoming data (using the look-up tables stored in element 108) in a manner analogous to that described above in FIGS. 1–5. However, in this embodiment, a multiframe buffer 104 is used to store a series of binary frame values. These values are then compared by motion estimator 106 to determine the motion state (e.g., fast, intermediate or slow). Depending on the motion state, different threshold values are selected from element 108.

Differential buffer 114 contains the changes between the last received frame in buffer 104 and the reference frame from buffer 116. The contents of the reference frame buffer 116 are updated at different times depending on the motion state, as described in more detail below. In the illustrated embodiment, the contents of the reference buffer will be the last frame when fast motion is occurring, or will be an average of the four most recent frames for intermediate motion, or will be an average of sixteen frames during the slow motion operating mode.

In the system of FIG. 10, the motion estimator 106 estimates the average amount of motion existing in the original scene between two instants in time. Motion estimation is an ongoing process at the transmitter, and every frame, a new motion estimate is generated. This estimate is used to either keep the resolution level unchanged or switch to a different resolution level.

For example, if L is a number representing the maximum level of motion allowed on the transmission channel, then a fast motion state can be defined as existing when the motion estimate is between the maximum motion level L and L/4. An intermediate motion state can be defined to exist when the motion estimate is between L/4 and L/16. A third state—slow motion—can be defined to exist when the motion estimate is less than L/16.

In one preferred embodiment, a change in the motion level in the scene can be signalled by the transmitter 112 to the receiver 138 by imbedding into the transmitted video bit stream a "resolution sync word" consisting of two additional bits of information per frame. In this way, it is possible for the receiver 138 to decode the resolution sync word, and know the resolution level to be used in the reconstruction of images. Different reconstruction procedure is then used in grey level computer 150 for each of the different resolution levels.

In the illustration of FIG. 10, motion estimation is based on the differential information, D(n), D(n−1), D(n−2), D(n−3) which represent the changes which have occurred over the four most recent frames. Specifically, the differential information at frame F(n), is equal to the difference between binary (i.e. black-and-white) frame F(n) and the previous binary frame F(n−1):

$$D(n)=F(n)-F(n-1)$$

F(n) is a binary matrix of 0's and 1's. Let sum [M] be the sum of all the elements of the matrix M. Then, the motion estimate at the time n, ME(n), can be defined as:

$$\begin{aligned} ME(n) &= \text{sum}[D(n)] + \text{sum}[D(n-1)] + \\ &\quad \text{sum}[D(n-2)] + \text{sum}[D(n-3)] \\ &= \text{sum}[F(n)] - \text{sum}[F(n-4)] \end{aligned}$$

and the motion estimate at time n+1 is $$\begin{aligned} ME(n) &= \text{sum}[D(n+1)] + \text{sum}[D(n)] + \\ &\quad \text{sum}[D(n-1)] + \text{sum}[D(n-2)] \\ &= \text{sum}[F(n+1)] - \text{sum}[F(n-3)]. \end{aligned}$$

The motion estimate represents the total number of bit changes that have occurred over the past four frames. This provides a reading of the motion level at the end of each frame. The four-frame averaging process and the readout of the motion estimate are synchronized to the frame sync.

If ME(n) is between L and L/4, a coarse resolution level is used (e.g., same as described above in connection with FIGS. 3 and 4).

If ME(n) is between L/4 and L/16, an intermediate resolution level is used.

If ME(n) is less than L/16, a fine resolution level is used.

It should be clear that other threshold choices can be made in distinguishing motion states.

In the embodiment of FIGS. 3 and 4, there was only one way to calculate the grey levels. This was done by averaging over 4×4 blocks the bit values within a binary frame F(n), i.e., the values at positions i, i+1, i+2, i+3 on lines j, j+1, j+2, and j+3.

In other words, for frame F(n), the grey level, $G_{i,j}(n)$, of pixel (i,j) was defined as:

$$G_{i,j}(n) = \sum_{K=0}^{3} \sum_{l=0}^{3} F_{i+k,j+l}(n)$$

However, in the embodiment of FIG. 10, the grey level can be calculated as:

$$G_{i,j}(n) = \sum_{m=0}^{q} \sum_{k=0}^{p} \sum_{l=0}^{p} F_{i+k,j+l}(n-m)$$

The notation (pxp,q) is used to represent this class of grey level estimates. The notation underlines the fact that the spatial sum of the binary values over a block of size p×p and the time sum over q frames. With this notation, a three grey level estimation scheme is illustrated in FIGS. 11A, 11B and 11C.

Specifically, FIG. 11A illustrates the course resolution level in which spatial averaging over a 4×4 pixel block from a single frame is used to derive a binary value in the grey-scale reduction unit. FIG. 11B illustrates the intermediate resolution level, where the grey level of a pixel is derived from both spatial averaging over a 2×2 block and time averaging over 4 successive frames. FIG. 11C illustrates the fine resolution level, where the averaging is over a 1×1 block, or 1 pixel, and over 16 successive frames. There is no spatial averaging, but only time averaging.

As the amount of motion decreases, the spatial averaging is decreased and more time averaging is introduced. The grey level resolution (e.g. thresholds) can be left unchanged at 16 levels or 4 bits of grey.

When n (less than or equal to 16) successive frames are averaged, n different threshold matrices are used. In total, the procedure uses one 4×4 threshold matrix, M, at the coarse resolution level, four 2×2 threshold matrices, M1 to M4, at the intermediate resolution, and 16 threshold levels at the fine resolution. The threshold matrices M, M1, M2, M3, M4 are given in FIGS. 11A and 11B. The 16 scaler thresholds are the values 16, 32, 48, . . . up to 256, i.e., values multiple of 16, as illustrated schematically in FIG. 11C. These matrices are for illustration purposes and other matrices can perform equally well.

With reference again to FIG. 10, a multi-frame buffer 104 is used in the transmitter 112 to calculate the motion level in the scene. A four-frame buffer is sufficient to calculate the estimate, once every frame. Reference buffer 116 is used to calculate the motion estimate and generate the differential information.

While in the coarse resolution mode or when switching to the coarse resolution mode, the previously-received frame can be used as the reference frame for calculating the differential information. The same convention is used at the receiver. The decision to switch to a different resolution level (such as intermediate or fine) can occur at the end of any frame.

Assuming that the decision to switch to intermediate resolution occurs immediately at the end of frame F(n), then the differential information D(n+1), D(n+2), D(n+3), D(n+4) is calculated using F(n) as the reference frame. This convention is also followed by the receiver. In other words, $$D(n+1) = F(n+1) - F(n)$$
$$D(n+2) = F(n+2) - F(n)$$
$$D(n+3) = F(n+3) - F(n)$$
$$D(n+4) = F(n+4) - F(n)$$

In addition, the transmitter does not switch to another resolution (coarse or fine) until all four differential frames have been transmitted. At that point, whether a resolution switch occurs or not, the last transmitted frame becomes the new reference frame.

If one assumes instead that a decision to switch to fine resolution occurred at the end of frame F(n), then this frame is used as the reference for the next 16 frames:

$$D(n + 1) = F(n + 1) - F(n)$$
$$D(n + 2) = F(n + 2) - F(n)$$
$$\vdots$$
$$D(n + 16) = F(n + 16) - F(n).$$

Again, the resolution does not switch during this period of time until the new pictures have been formed.

With reference again to FIG. 10, it should be noted that controller 110 can be used to desensitize the updating mechanism of the differential buffer 114 based upon conditions in the channel buffer 120. When the channel buffer 120 exceeds a limit (defined by the transmission bandwidth) controller 110 can increase hysteresis by incrementing the dither parameter δ, thereby making it more difficult to toggle a particular pixel and, hence, reducing the number of pixel changes recorded in the differential buffer 114. This same mechanism also provided flicker control.

At the receiver 138, a multi-frame buffer 146 can be used to store data values over a series of frames so that the grey-level computer 150 can calculate the grey levels, e.g., by spatial averaging in the fast motion mode, by space and time averaging over four frames in the intermediate motion mode, or by time averaging over 16 frames in the slow motion mode.

It should be appreciated that various alternative averaging techniques can be substituted for this method, including, for example, approaches in which the pixel to be averaged is centered in the matrix, as well as methods in which weighted values are applied to various pixel values within the matrix.

What is claimed is:

1. In a signal processing apparatus for video image data compression, a system comprising:

dithered threshold means for applying dithered threshold values to a multiple-level grey-scale image to convert said multiple grey-scale image into a reduced-level grey-scale image, the dithered threshold values varying spatially across an image and temporally across plural images;

storage means for storing a reference reduced grey-scale image derived from image pixel values;

comparison means for comparing a reduced grey-scale image of a current image frame with a reference image from said storage means, and for generating a luminance difference signal representative of the changes in reduced grey-scale pixel values between image frames;

encoding means for encoding said difference signal for transmission through a transmission system;

decoding means; and reconstruction means for generating an expanded grey-scale image from the luminance difference signal having expanded levels from the reduced grey-scale image pixel values with substantially the same number of pixel values as in the reduced grey-scale image by averaging pixel values of respective blocks of pixel values, a different block of pixel values for each expanded pixel value defined by a shifting window over pixel values of the reduced grey-scale image.

2. The system of claim 1 in which the encoding means further comprises a run-length encoding means for representing series of repeating differential image data bits in a coded fashion, such that long series of said bits are represented by fewer bits.

3. The system of claim 1 wherein the system further includes an adaptive resolution means for determining a level of motion in successive image frames and for modifying spatial resolution in response to such determination.

4. In a signal processing apparatus for video image data compression, a system comprising:

dithered threshold means for applying dithered threshold values to a multiple-level grey-scale image to convert said multiple grey-scale image into a reduced-level grey-scale image;

storage means for storing a reference reduced grey-scale image derived from image pixel values;

comparison means for comparing a reduced grey-scale image of a current image frame with a reference image from said storage means, and for generating a luminance difference signal representative of the changes in reduced grey-scale pixel values between image frames;

encoding means for encoding said difference signal for transmission through a transmission system;

decoding means;

reconstruction means for generating an expanded grey-scale image from the luminance difference signal having expanded levels from the reduced grey-scale image pixel values with substantially the same number of pixel values as in the reduced grey-scale image by averaging pixel values of respective blocks of pixel values, a different block of pixel values for each expanded pixel value defined by a shifting window over pixel values of the reduced grey-scale image; and wherein the dithered threshold values comprise sets of values varying spatially across an image, different sets representing different spatial resolutions, the system further comprising a resolution selector to select a set of dithered threshold values for the threshold means.

5. The system of claim 4 in which the dithered threshold means further comprises a hysteresis adjustment in which a threshold value applied to each pixel is modified in order to reduce toggling of the pixel value.

6. The system of claim 5 in which the system further comprises means for varying the hysteresis adjustment when a data rate of the encoded difference signal exceeds a limited bandwidth of a transmission medium.

7. In a signal processing apparatus for decoding and reconstructing a video image from received compressed image data, a system comprising:

a differential image decoding unit for decoding a difference signal representative of changes in a reduced grey-scale image from one frame to the next;

an image updating unit for updating changes to a previously stored image by adding said decoded difference signal to said previously stored image and thereby obtaining an updated image of reduced grey-scale pixel values; and an image reconstruction unit for expanding each reduced grey-scale pixel value for each reduced grey-scale image by averaging pixel values of respective blocks of pixel values, a different block of pixel values for each expanded pixel value defined by a shifting window over pixel values of the reduced grey-scale image, to increase the number of grey levels of said updated image with substantially the same number of pixel values as in the reduced grey-scale image, wherein the blocks of pixel values include pixel values from plural updated images for both spatial and temporal averaging.

8. The system of claim 7 which further comprises an image interpolating unit for generating a more detailed image by interpolation.

9. A method of signal processing for image data compression, the method comprising:

reducing the number of grey levels available to represent each pixel of an image frame by comparing a dithered threshold value to the luminance value of each pixel, and assigning the pixel a reduced grey-scale value based upon the comparison;

storing a reference reduced grey-scale image derived from image pixel values;

comparing a reduced grey-scale image of a current image frame with a previously stored reference reduced grey-scale image;

generating a luminance difference signal representative of changes in the reduced grey-scale pixel values between image frames;

reconstructing an expanded-level grey-scale image from the luminance difference signal with substantially the same number of pixel values in the reduced grey-scale image by averaging pixel values of respective blocks of pixel values, a different block of pixel values for each expanded pixel value defined by a shifting window over pixel values of the reduced grey-scale image; and storing sets of dithered threshold values, different sets representing different spatial resolutions, and selecting a set of dithered threshold values for the step of comparing.

10. The method of claim 9 in which the step of reducing the number of grey levels comprises converting a multiple grey-scale image into a halftone image.

11. The method of claim 9 in which the step of comparing a dithered threshold value further comprises applying a hysteresis adjustment to said threshold value in order to reduce toggling of the pixel value.

12. The method of claim 11 in which the method further comprises varying the hysteresis adjustment in response to the data rate of the encoded difference signal.

13. The method of claim 9 in which the step of encoding the luminance difference signal further comprises run-length encoding said signal such that commonly repeated series of image data bits are assigned shorter code words.

14. A method of signal processing for image data compression, the method comprising:

reducing the number of grey levels available to represent each pixel of an image frame by comparing a dithered threshold value to the luminance value of each pixel, and assigning the pixel a reduced grey-scale value based upon the comparison;

storing a reference reduced grey-scale image derived from image pixel values;

comparing a reduced grey-scale image of a current image frame with a previously stored reference reduced grey-scale image;

generating a luminance difference signal representative of changes in the reduced grey-scale pixel values between image frames;

reconstructing an expanded-level grey-scale image from the luminance difference signal with substantially the same number of pixel values in the reduced grey-scale image by averaging pixel values of respective blocks of pixel values, a different block of pixel values for each expanded pixel value defined by a shifting window over pixel values of the reduced grey-scale image; and storing dithered threshold values varying spatially across an image and temporally across plural images, and performing the step of comparing based on the spatially and temporally varying dithered threshold values.

15. The method of claim 14 further comprising storing sets of dithered threshold values, different sets representing different spatial resolutions, and selecting a set of dithered threshold values for the step of comparing.

16. A dithered threshold system for generating reduced grey-scale video images comprising:

sets of stored three dimensional arrays of dithered threshold values, each varying spatially across an image and varying temporally across plural images as an integral block of related dithered threshold values, different sets representing different resolutions;

threshold means for comparing grey-scale image pixel values of a sequence of video images to the stored dithered threshold values to generate reduced grey-scale image pixel values; and a resolution selector for selecting a set of stored dithered threshold values for the threshold means.

17. A dithered threshold system for generating reduced grey-scale video images comprising:

a stored three dimensional array of dithered threshold values varying spatially across an image and varying temporally across plural images as an integral block of related dithered threshold values;

threshold means for comparing grey-scale image pixel values of a sequence of video images to the stored dithered threshold values to generate reduced grey-scale image pixel values; and a reconstruction means for generating an expanded-level grey-scale image by combining reduced grey-scale image pixel values across a spatially and temporally extending block of reduced grey-scale pixel values.

18. The system of claim 17 wherein the stored three dimensional array of dithered threshold values further comprise sets of dithered threshold values, different sets representing different resolutions, and further comprising a resolution selector for selecting a set of stored dithered threshold values for the threshold means.

19. The system of claim 18 wherein the resolution selector comprises a motion detector for detecting motion between successive images.

20. The system of claim 19 wherein the motion detector detects motion based on a count of pixels which vary between images.

21. The system of claim 17 wherein the reconstruction means averages pixel values of respective blocks of pixel values, a different block of pixel values for each expanded pixel value.

22. A dithered threshold system for generating a reduced-level grey-scale image comprising:

stored sets of dithered threshold values varying spatially across an image, different sets representing different spatial resolutions;

a resolution selector comprising a motion detector for detecting motion between successive images; and threshold means for comparing grey-scale image pixel values to a set of stored dithered threshold values selected by the resolution selector to generate reduced grey-scale image pixel values.

23. The system of claim 22 wherein the stored sets of dithered threshold values vary spatially across an image and temporally across plural images.

24. The system of claim 22 wherein the motion detector detects motion based on a count of pixels which vary between images.

25. A method of generating reduced video grey-scale images comprising:

storing sets of three dimensional arrays of dithered threshold values, each as an integral block of related dithered threshold values which vary spatially across an image and temporally across plural images, different sets representing different resolutions; and comparing grey-scale image pixel values of a sequence of video images to the stored dithered threshold values to generate reduced grey-scale image pixel values; and reconstructing an expanded grey-scale image by combining reduced grey-scale image pixel values across a spatially and temporally extending block of reduced grey-scale pixel values.

26. The method of generating reduced grey-scale video images comprising:

storing sets of dithered threshold values varying spatially across an image, different sets representing different spatial resolution;

selecting a set of dithered threshold values based on changes between successive video image frames which indicate movement between frames; and comparing grey-scale image pixel values to a selected set of stored dithered threshold values to generate reduced grey-scale image pixel values.

27. In a signal processing apparatus for image data compression, a system comprising:

stored sets of dithered threshold values varying spatially across an image and temporally across plural images, different sets representing different spatial resolutions;

a resolution selector for selecting resolution based on content of successive grey-scale images;

dithered threshold means for applying dithered threshold values to a multiple-level grey-scale image to convert the multiple-level grey-scale image into a reduced-level grey-scale image;

storage means for storing a reference reduced grey-scale image derived from image pixel values;

comparison means for comparing a reduced grey-scale image of a current image frame with a reference image from the storage means, and for generating a luminous difference signal representative of changes in the reduced grey-scale pixel values between image frames;

run length encoding means for encoding the difference signal for transmission through a limited bandwidth transmission system;

decoding means; and reconstruction means for generating an increased grey-scale image from the luminous difference signal, the reconstruction means including an averaging unit for expanding the grey-scale pixel values for each reduced grey-scale image by averaging pixel values of respective blocks of pixel values, a different block of pixel values for each expanded pixel value, to increase the number of grey levels of a reconstructed image.

28. A signal processing apparatus for expanding an image from reduced grey-scale image data comprising:

storage of pixel values of a reduced grey-scale image; and an image expander for expanding each reduced grey-scale pixel value by averaging pixel values of respective blocks of pixel values, including pixel values from plural updated images for both spatial and temporal averaging, a different block of pixel values for each expanded pixel value defined by a shifting window over pixel values of the reduced grey-scale image, to increase the number of grey levels of each pixel with substantially the same number of pixel values as in the reduced grey-scale image.

29. In a signal processing apparatus for video image data compression, a system comprising:

dithered threshold means for applying dithered threshold values, which vary spatially across an image and temporally across plural images, to multiple-level grey-scale images to convert said multiple grey-scale images into reduced-level grey-scale images;

storage means for storing a reference reduced grey-scale image derived from image pixel values;

comparison means for comparing a reduced grey-scale image of a current image frame with a reference image from said storage means, and for generating a luminance difference signal representative of the changes in reduced grey-scale pixel values between image frames;

encoding means for encoding said difference signal for transmission through a transmission system;

decoding means; and reconstruction means for generating an expanded grey-scale image from the luminance difference signal having expanded levels from the reduced grey-scale image pixel values.

30. In a signal processing apparatus for video image data compression, a system comprising:

dithered threshold means for applying dithered threshold values to a multiple-level grey-scale image to convert said multiple-level grey-scale image into a reduced-level grey-scale image, the dithered threshold values comprising sets of values varying spatially across an image, different sets representing different spatial resolutions;

a resolution selector to select a set of dithered threshold values for the threshold means;

storage means for storing a reference reduced grey-scale image derived for image pixel values;

comparison means for comparing a reduced grey-scale image of a current image frame with a reference image from said storage means, and for generating a luminance difference signal representative of the changes in reduced grey-scale pixel values between image frames;

encoding means for encoding said difference signal for transmission through a transmission system;

decoding means; and reconstruction means for generating an expanded grey-scale image from the luminance difference signal having expanded levels from the reduced grey-scale image pixel values.

31. The system of claim 30 in which the dithered threshold means further comprises a hysteresis adjustment in which a threshold value applied to each pixel is modified in order to reduce toggling of the pixel value.

32. The system of claim 31 in which the system further comprises means for varying the hysteresis adjustment when a data rate of the encoded difference signal exceeds a limited bandwidth of a transmission medium.

33. In a signal processing apparatus for decoding and reconstructing a video image from received compressed image data, a system comprising:

a differential image decoding unit for decoding a difference signal representative of changes in a reduced grey-scale image from one frame to the next;

an image updating unit for updating changes to a previously stored image by adding said decoded difference signal to said previously stored image and thereby obtaining an updated image of reduced grey-scale pixel values; and an image reconstruction unit for expanding each reduced grey-scale pixel value for each reduced grey-scale image by combining pixel values of respective blocks of pixel values, each block including pixel values from plural updated images for both spatial and temporal averaging and there being a different block of pixel values for each expanded pixel value, to increase the number of grey levels of said updated image.

34. A method of signal processing for image data compression, the method comprising:

storing sets of dithered threshold values, different sets representing different spatial resolutions, and selecting a set of dithered threshold values;

reducing the number of grey levels available to represent each pixel of an image frame by comparing a dithered threshold value of the selected set of dithered threshold values to the luminance value of each pixel, and assigning the pixel a reduced grey-scale value based upon the comparison;

storing a reference reduced grey-scale image derived from image pixel values;

comparing a reduced grey-scale image of a current image frame with a previously stored reference reduced grey-scale image;

generating a luminance difference signal representative of changes in the reduced grey-scale pixel values between image frames; and reconstructing an expanded-level grey-scale image from the luminance difference signal.

35. A method of signal processing for image data compression, the method comprising:

storing dithered threshold values varying spatially across an image and temporally across plural images;

reducing the number of grey levels available to represent each pixel of an image frame by comparing a dithered threshold value of the spatially and temporally varying dithered threshold values to the luminance value of each pixel, and assigning the pixel a reduced grey-scale value based upon the comparison;

storing a reference reduced grey-scale image derived from image pixel values;

comparing a reduced grey-scale image of a current image frame with a previously stored reference reduced grey-scale image;

generating a luminance difference signal representative of changes in the reduced grey-scale pixel values between image frames; and reconstructing an expanded-level grey-scale image from the luminance difference signal.

36. The method of claim 35 further comprising storing sets of dithered threshold values, different sets representing different spatial resolutions, and selecting a set of dithered threshold values for the step of comparing.

37. A dithered threshold system for generating a reduced grey-scale image comprising:

stored dithered threshold values varying spatially across an image and temporally across plural images;

threshold means for comparing grey-scale image pixel values to the stored dithered threshold values to generate reduced grey-scale image pixel values; and reconstruction means for generating an expanded-level grey-scale image by combining reduced grey-scale image pixel values across a spatially and temporally extending block of reduced grey-scale pixel values.

38. The system of claim 37 wherein the stored dithered threshold values further comprise sets of dithered threshold values, different sets representing different resolutions, and further comprising a resolution selector for selecting a set of stored dithered threshold values for the threshold means.

39. The system of claim 38 wherein the resolution selector comprises a motion detector for detecting motion between successive images.

40. The system of claim 39 wherein the motion detector detects motion based on a count of pixels which vary between images.

41. The system of claim 37 wherein the reconstruction means averages pixel values of respective blocks of pixel values, a different block of pixel values for each expanded pixel value.

42. A method of generating a reduced grey-scale image comprising:

storing sets of dithered threshold values representing different spatial resolutions which vary spatially across an image and temporally across plural images;

comparing grey-scale image pixel values to the stored dithered threshold values to generate reduced grey-scale image pixel values; and reconstructing an expanded grey-scale image by combining reduced grey-scale image pixel values across a spatially and temporally extending block of reduced grey-scale pixel values.

43. A signal processing apparatus for expanding an image from reduced grey-scale image data comprising:

storage of pixel values of a reduced grey-scale image; and an image expander for expanding each reduced grey-scale pixel value by combining pixel values of respective blocks of pixel values, each block including pixel values from plural updated images for both spatial and temporal averaging and there being a different block of pixel values for each expanded pixel value, to increase the number of grey levels of each pixel.

* * * * *